Figure 1:
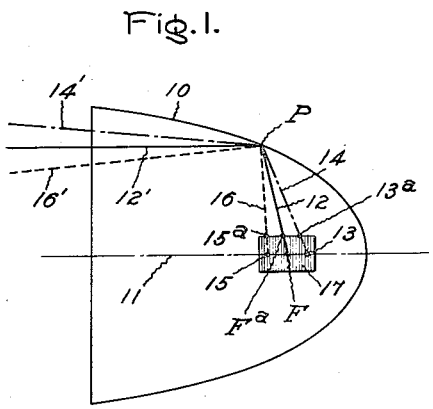

P. S. BAILEY.
FLOODLIGHT REFLECTOR.
APPLICATION FILED MAY 11, 1918.

1,281,752.

Patented Oct. 15, 1918.

Inventor:
Percy S. Bailey,
by Albert G. Davis
His Attorney.

UNITED STATES PATENT OFFICE.

PERCY S. BAILEY, OF LYNN, MASSACHUSETTS, ASSIGNOR TO GENERAL ELECTRIC COMPANY, A CORPORATION OF NEW YORK.

FLOODLIGHT-REFLECTOR.

1,281,752.   Specification of Letters Patent.   Patented Oct. 15, 1918.

Application filed May 11, 1918. Serial No. 233,853.

*To all whom it may concern:*

Be it known that I, PERCY S. BAILEY, a citizen of the United States, residing at Lynn, in the county of Essex, State of Massachusetts, have invented certain new and useful Improvements in Floodlight-Reflectors, of which the following is a specification.

Figure 2:
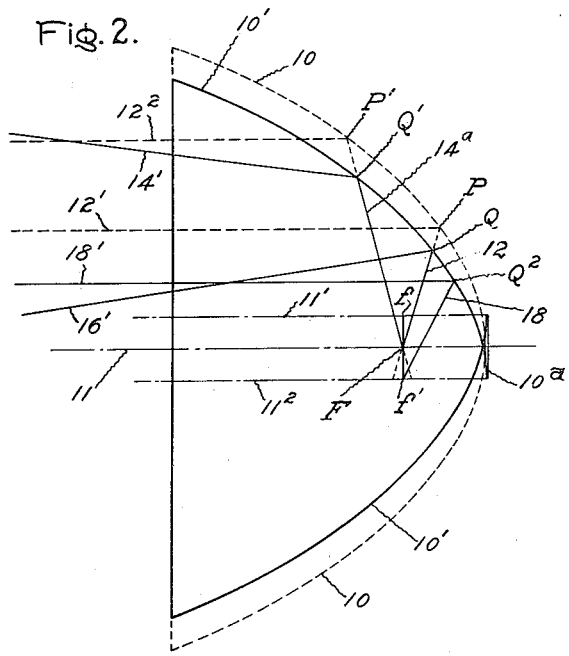
Figure 3:
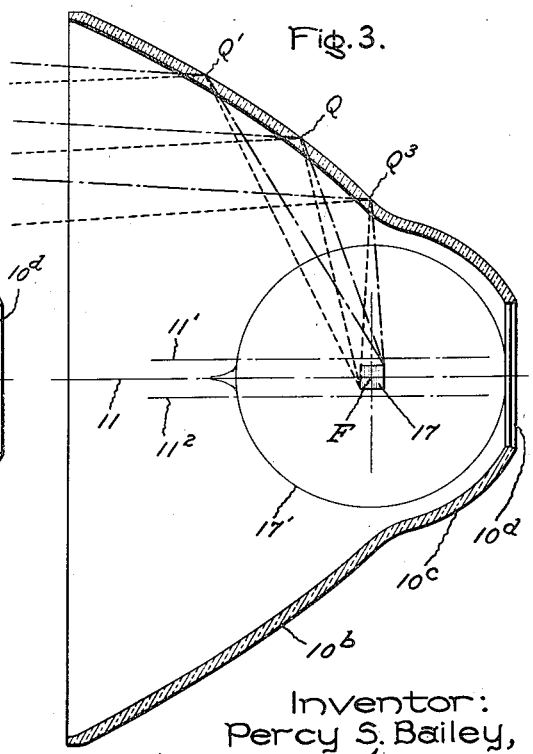
Figure 4:
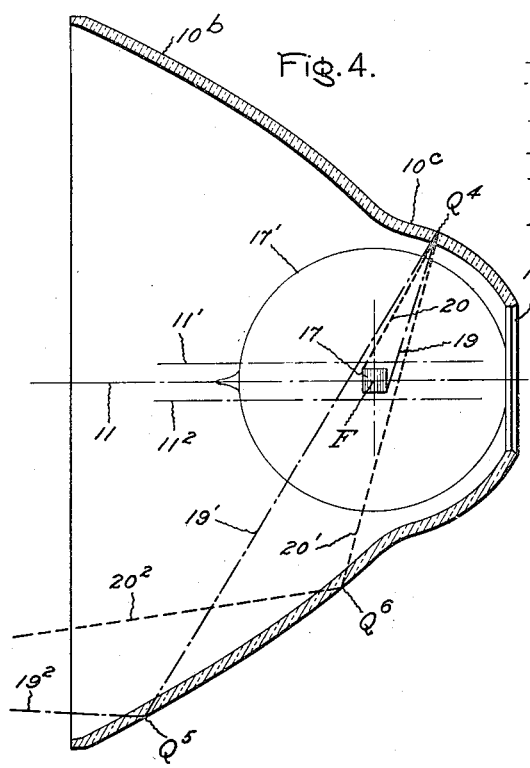

My invention has reference to improvements in floodlight reflectors, designed to give a more extended field of illumination than has heretofore been achieved by paraboloidal reflectors, whether the source of light was centered at the focus of the paraboloid, or behind, or in front of it, or with the source extending axially in both directions from the focus and in each case also extending laterally in all directions about the axis. I accomplish this result by a reflector that presents a body of revolution that is generated by rotating a parabola not about its geometric axis (which is the common way of generating such body of revolution) but by splitting the parabola axially, shifting the two halves toward each other and rotating the two shifted halves about their common new axis of symmetry. By this process the focus of the parabola describes the circumference of a circle, which becomes the locus of all foci of the new body of revolution. If we now imagine a point source of light placed at the intersection of the axis of symmetry with the focal plane, and if any axial section, of the body of revolution is considered, then this point, being in the center of the focal plane, is not in the focus of any of the parabolic curves produced by such section, and the rays proceeding from the imagined point source of light will be reflected by the different parabolas which it strikes, differently, in accordance with the laws which govern the reflection from parabolic surfaces. But since a point source of light is not available, each source having always more or less extension in space, it will, generally, be both to the right and to the left and on all sides of the intersection of the new axis of symmetry with the focal plane, and the rays proceeding from the different points of such extended source will again be reflected differently in accordance with the laws which govern the reflection from paralolic surfaces, but resulting as will be more fully explained further on, in a more extended field of illumination than is obtained from a regular paraboloid with an extended source of light about its focus. A further result of this arrangement is that the luminous flux projected into the field of illumination is substantially greater than with any other arrangement heretofore used. All this will more fully appear from the following detail description with reference to the accompanying drawing, in which:

Figure 1 is a diagram of a parabola serving as a basis for the statement of those laws of reflection from paraboloidal surfaces, which are essential for the understanding of the present invention; Fig. 2 is a diagram of a parabola explanatory of the method of generating the body of revolution the surface of which constitutes the reflector in accordance with the invention; Fig. 3 is an axial section of the new reflector in one of the forms used in practice and illustrating the distribution of light by the same, and Fig. 4 is a like view, still further illustrating the distribution of light.

The parabola 10, shown in Fig. 1 may be looked upon as a vertical axial section of a regular reflecting paraboloid, the axis of the parabola being indicated at 11, and the focus at F. If a point source of light is assumed to be located at the focus, any ray from the same, say the ray 12, striking any point of the parabola, say the point P, will be reflected along a line 12', parallel to the axis. Another point source of light, located in the axis, but inside the focal distance (nearer the vertex) say at 13, will emit a ray 14 which strikes the same point P of the parabola, and this ray will be reflected along the line 14', divergent from the axis, while a ray from a still other point source 15, in the axis but beyond the focal distance (more remote from the vertex) such as ray 16, striking the same point P, of the parabola, will be reflected along the line 16', converging toward the axis.

In practice an isolated point source of light is, of course, not available, every available source of light being extended in space, but theoretically it is possible to resolve the surface of an extended source of light into its elementary points and by contemplating each element separately, the distribution of light from the same and from the whole surface may be understood. For this purpose an extended source of light is indicated by the shaded rectangle 17 in Fig. 1, and it will be seen that where the lines 12, 14, 16, representing rays from the assumed point sources F, 13, 15, intersect the surface of the extended source 17, these points of intersection do in fact represent point sources of light. These points are marked $F^a$, $13^a$ and $15^a$, and lines 12, 14, and 16 represent the rays from these point sources which strike the parabola at P and are reflected in the directions 12', 14' and 16', respectively.

It follows from the foregoing that any ray proceeding from any point on the surface of an extended source of light along a line which in its prolongation intersects the axis of a parabola, is reflected from the parabola in the same manner as if it proceeded from a point source at the point of intersection at the axis. This is a very simple rule, but it should be noticed that it applies only to rays the lines of which, when prolonged, intersect the axis, and does not apply to rays the lines of which in their prolongation pass over, under, or to either side of the axis. With respect to the reflection of such rays no such simple specific rule can be formulated, but the more general law of reflection from any reflecting element applies to the same, namely that every reflecting element projects into the field of illumination a reversed image of the source as the same is viewed from the point of incidence. Consequently, the multitudinous images, all varying from each other in shape produce a diffuse field of illumination. In this respect the effect of the reflector which forms the subject of the present invention does not materially differ from the effect produced by an ordinary paraboloid, and it is, therefore, not necessary here to dwell upon the rays, the lines of which, in their prolongation do not intersect the axis.

The new reflector and the method of generating the same are illustrated in Fig. 2. An ordinary parabola 10 shown in dotted lines with its focus at F and its axis at 11 is used for the development of the new reflector 10', shown in solid lines. The first step of the development is to split the parabola along the axis and to shift each half toward the other, with the lines of the cut parallel to each other and to the original position of the axis, an equal distance. This brings the line of cut of the lower half of the parabola to the position 11', and the line of cut of the upper half of the parabola to the position $11^2$, while the two halves of the original parabola take the positions indicated in solid lines by the numerals 10' 10'. By this manipulation the line 11' becomes the axis of the lower half of the upwardly shifted branch 10', while the line $11^2$ becomes the axis of the upper half of the downwardly shifted branch 10'. The focus for the lower branch is now at $f$ and the focus for the upper branch is at $f'$, and the two branches intersect near their vertices as indicated.

The line 11, which originally was the axis of the parabola 10, has now become the axis of symmetry of the two intersecting branches 10', 10', each of which is a true parabolic curve.

The surface of the new reflector is generated by rotating the two shifted halves of the original parabola about their axis of symmetry 11 (which is in the same position as the axis of the original parabola), whereby the two branches describe a body of revolution, each axial section of which on the left hand side of the intersection near the vertices presents two parabolic curves, such as 10', 10', while on the right hand side of the intersection near the vertices, a conoidal body is formed marked by the numeral $10^a$ in the drawing. This conoidal body, or its surface, is not a part of my reflectors; in fact its formation is suppressed in actual practice and a considerable portion of the vertex is removed, as will appear farther on; it is here only referred to as an incident. By the rotation about the axis of symmetry the two shifted foci $f$, $f'$, describe the periphery of a circle which becomes the locus of the foci of all parabolic curves obtained by all axial sections of the new body of revolution. The two curves 10', 10' represent one such section, a vertical axial section, and the line $f$, $f'$ represents the section through the circular focal plane.

It will be observed that by the process of generating the new body of revolution the axis 11' of the lower half of the original parabola moves parallel with itself and with the new axis of symmetry, describing the surface of a cylinder of which the axis of symmetry is the geometrical axis; the axis $11^2$ of the upper half of the original parabola moves in the same manner, so that the cylinder 11', $11^2$, of which 11 is the geometrical axis, is the locus of the axes of all parabolic curves obtained by all axial sections of the new body of revolution. These axes, therefore, are all parallel to each other and to the axis of symmetry and all on the surface of a cylinder. This cylinder, therefore, may be looked upon as the directrix of the new body of revolution, the generatrix of which is either one-half or are both halves of the original parabolic curves 10, 10, as shifted toward each other in the manner hereinbefore described.

The characteristic differences between the ordinary paraboloid and the new body of revolution produced in accordance with my invention will now be readily understood. In the ordinary paraboloid every axial section is a complete parabola and all these parabolas have the same axis and the same focus, so that the rays from a point source of light in the common focus are reflected parallel to the common axis. In the new body of revolution every section along the axis of symmetry presents two parabolic curves, each having an axis different from but parallel to the other, and consequently each having a differently located focus, so that the rays from a point source of light at any of these foci will be reflected parallel to the axis of symmetry only from points in the parabolic curve to which the particular focus belongs; from any other point of the new surface of revolution, such rays will be reflected differently, either converging toward or diverging from the axis of symmetry.

If in Fig. 2, a point source of light is located at F, then any rays from the same, such as 12, 14$^a$, striking the paraboloid 10 at any points as at P, P', are reflected along the lines 12', 12$^2$ parallel to the axis 11. If, however, to these rays is interposed the new body of revolution 10, then these same rays, incident at Q and Q', are reflected along the lines 16' and 14', respectively, the former converging toward the axis and the latter diverging from the same, because the rearward prolongation of ray 12 intersects the axis 11$^2$ of the upper parabolic curve 10' in front of the focus f' of that curve, as indicated in the drawing and the rearward prolongation of ray 14$^a$ intersects the axis behind the focus as is also indicated in the drawing. This is in accordance with the law of reflection from parabolic curves hereinbefore explained with reference to Fig. 1. Similarly, a ray 18 from the focus f', incident upon any point Q$^2$ of the upper parabolic curve 10' is reflected along line 18', parallel to the axis.

In Fig. 2 no extended source of light is indicated in order to avoid crowding of the lines, but it will be readily understood that any of the rays shown as proceeding from a point source at F and f' when proceeding from corresponding points of the surface of an extended source, where the lines of these rays itersect that surface, will be reflected exactly in the directions shown in the drawing.

From the preceding exposition it is clear that the distribution of light into the field of illumination by means of a reflector constructed in accordance with my invention is markedly different from that obtained by the use of an ordinary paraboloid; it is, in particular, more nearly uniformly dense, not fading out rapidly from the center of the field outwardly, so that the objects near the margin of the field are illuminated nearly as intensely as those in the center; the effective field of illumination is, therefore, more extended. In addition thereto the reduction of the opening of the reflector due to the mode of generating the same, makes the solid angle of luminous flux from the source on to the reflector greater than with an ordinary paraboloid of the same focal length; the illumination of the field is therefore, more intense.

In the practical application of the invention the reflector may be made of metal, the reflecting surface highly polished, or it may be made of glass in which case a deposit of silver on the outer surface constitutes the reflecting surface. The reflector 10', 10', shown in Fig. 2, may be looked upon as made of metal, in which case an opening at the vertex would ordinarily be provided for the reception of the shank of an incandescent lamp; this is a well known practice.

In all reflectors of the parabolic type a short focal length is preferred, because it affords a greater solid angle of luminous flux from the source upon the reflecting surface than one of greater focal length; but when a large incandescent lamp is to be used reflectors of short focal length do not afford sufficient space for the reception of the large bulb, and for this reason the rear part of the reflector, the region at and near the vertex is often expanded spherically; only an unimportant part of parabolic reflecting surface is thereby sacrificed. In each of Figs. 3 and 4 a vertical axial section of a glass reflector, constructed in accordance with my invention and formed with a rearward spherical expansion is shown.

The glass reflector 10$^b$ has in the vertex region the spherical expansion 10$^c$, the rear end of which is formed with an opening 10$^d$, for the reception of the usual metal socket, which in turn receives the shank of the large incandescent lamp 17', the coiled filament of which constitutes the extended source of light 17, from the surface of which various rays are shown as impinging upon the parabolic reflecting surface at Q, Q', Q$^3$, from which they are reflected convergently and divergently, as indicated, in the manner described with reference to Fig. 2. The spherical expansion 10$^c$ has its center in the center F of the focal plane, so that any ray projected by the source toward the sphere in a direction which does not coincide with the radius of the sphere, will not be reflected upon itself and many of these rays will be reflected toward the parabolic part of the reflector and will from the latter be reflected into the field of illumination, either convergently or divergently according to the direction in which they are received by the parabolic portion of the reflector.

This is illustrated in Fig. 4, where rays 19 and 20, are shown as striking the spherical part of the reflector at Q$^4$. Ray 19, is or may be reflected in the direction 19' and impinges upon the parabolic part of the reflector at Q$^5$. Since this ray is received at Q$^5$ as if it proceeded from a point of the axis 11' of the lower parabolic curve and situated to the left of the focal plane, it will be reflected at $Q^5$ convergently in the direction $19^2$. Ray 20, is or may be reflected at $Q^4$ in the direction $20'$ and impinges at $Q^6$ as if it proceeded from a point of the axis $11'$ situated to the right of the focal plane, it will be reflected at $Q^6$ divergently in the direction $20^2$.

It will now be seen that the substitution of a spherical reflecting surface for a portion of the parabolic reflecting surface at and about the vertex is not altogether a loss, since a considerable portion of the rays received by the spherical substitute is ultimately thrown into the field of illumination.

In the practice of this invention I am not limited to any particular amount of shift toward each other of the two halves of the original parabola 10, this shift is usually small, varying between one-eighth ($\frac{1}{8}$) and one-half ($\frac{1}{2}$) of an inch, but considerable latitude in this respect is permissible.

Having now fully described my invention, I claim and desire to secure by Letters Patent:

1. A reflector comprising a surface of revolution, every section of which along the axis of symmetry presents two symmetrically opposed parabolic curves, each curve having a distinct axis and focus, the two axes being parallel, on opposite sides of the axis of symmetry, and each within the area delimited by the opposing curve and its axis.

2. A reflector comprising a surface of revolution, every section of which along the axis of symmetry presents two symmetrically opposed, parabolic curves, each curve having a distinct axis and focus, all the axes having their locus upon the surface of a cylinder co-axial with the axis of symmetry and all the foci having their locus on the periphery of a circle concentric with the locus of the axes.

3. A reflector comprising a surface of revolution evolved by two overlapping symmetrically opposed like parabolic curves, as generatrix, and a cylinder concentric with the axis of symmetry and in contact with the geometrical axes of the two curves, as directrix.

In witness whereof I have hereunto set my hand this 8th day of May, 1918.

PERCY S. BAILEY.